United States Patent
Nissen et al.

(10) Patent No.: US 12,435,703 B2
(45) Date of Patent: Oct. 7, 2025

(54) NACELLE FOR A WIND TURBINE

(71) Applicant: Vestas Wind Systems A/S, Aarhus N. (DK)

(72) Inventors: Christian Fløe Nissen, Silkeborg (DK); René Lausten, Aarhus N (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/707,199

(22) PCT Filed: Oct. 19, 2022

(86) PCT No.: PCT/DK2022/050218
§ 371 (c)(1),
(2) Date: May 3, 2024

(87) PCT Pub. No.: WO2023/088525
PCT Pub. Date: May 25, 2023

(65) Prior Publication Data
US 2025/0003395 A1 Jan. 2, 2025

(30) Foreign Application Priority Data

Nov. 16, 2021 (EP) ..................................... 21208524
Dec. 30, 2021 (DK) ............................ PA 202170681

(51) Int. Cl.
*F03D 80/80* (2016.01)
*F03D 13/10* (2016.01)
*F03D 13/40* (2016.01)

(52) U.S. Cl.
CPC .......... *F03D 80/821* (2023.08); *F03D 13/116* (2023.08); *F03D 13/122* (2023.08);
(Continued)

(58) Field of Classification Search
CPC .... F03D 80/821; F03D 13/116; F03D 13/122; F03D 13/403; F03D 80/881; F03D 13/40;
(Continued)

(56) References Cited

U.S. PATENT DOCUMENTS 7,918,632 B2    4/2011   Mogensen et al.
11,788,510 B2 *  10/2023  Fàbrega Freixes ..... F03D 13/20
                                                       416/244 R
(Continued)

FOREIGN PATENT DOCUMENTS

EP         2550453 A2    1/2013
EP         3247899 A1   11/2017
(Continued)

OTHER PUBLICATIONS

Danish Patent and Trademark Office, examination report issued in corresponding DK Application No. PA 2021 70681, dated Jun. 13, 2022.
(Continued)

*Primary Examiner* — Pedro J Cuevas
(74) *Attorney, Agent, or Firm* — Wood Herron & Evans LLP (57) ABSTRACT

The invention relates to a wind turbine nacelle (2) configured for mounting on a wind turbine tower (3) and housing a rotor-supporting assembly supporting a rotor, the nacelle further housing a power conversion assembly, the nacelle comprising: —a main unit (20, 101) arranged to be connected to the wind turbine tower (3) and housing the rotor-supporting assembly, and—at least one auxiliary unit (21, 22, 102) housing an operative component (34, 35, 104) forming part of the power conversion assembly, wherein the main unit (20, 101) and the auxiliary unit (21, 22, 102) are separate units configured to be connected by a unit fixation structure at an interface, and wherein the at least one
(Continued)

auxiliary unit has a first height in an assembled configuration and a second height in a transportation configuration, the first height being higher than the second height.

24 Claims, 9 Drawing Sheets

(52) U.S. Cl.
CPC ......... *F03D 13/403* (2023.08); *F03D 80/881* (2023.08); *F05B 2240/142* (2013.01)

(58) Field of Classification Search
CPC . F03D 80/80; F05B 2240/142; F05B 2240/14
See application file for complete search history.

(56) References Cited

U.S. PATENT DOCUMENTS

| | | | |
|---|---|---|---|
| 11,846,271 B2* | 12/2023 | Baun | F03D 13/20 |
| 11,946,446 B2* | 4/2024 | Baun | F03D 80/003 |
| 11,971,016 B2* | 4/2024 | Baun | F03D 13/122 |
| 12,031,519 B2* | 7/2024 | Baun | F03D 13/10 |
| 2013/0011272 A1 | 1/2013 | Mortensen et al. | |
| 2022/0389907 A1* | 12/2022 | Baun | F03D 9/19 |
| 2022/0412315 A1* | 12/2022 | Baun | F03D 9/19 |
| 2023/0073244 A1* | 3/2023 | Fàbrega Freixes | F03D 13/20 |
| 2024/0247637 A1* | 7/2024 | Baun | F03D 80/00 |
| 2024/0254969 A1* | 8/2024 | Baun | F03D 80/881 |
| 2025/0035087 A1* | 1/2025 | Sørensen | F03D 13/116 |
| 2025/0179988 A1* | 6/2025 | Vcelka | F03D 13/403 |

FOREIGN PATENT DOCUMENTS

| | | |
|---|---|---|
| EP | 3276169 A1 | 1/2018 |
| EP | 3875758 A1 | 9/2021 |
| WO | 2021098927 A1 | 5/2021 |
| WO | 2021098928 A1 | 5/2021 |
| WO | 2021098931 A1 | 5/2021 |

OTHER PUBLICATIONS

International Searching Authority, International Search Report and Writen Opinion issued in corresponding PCT Patent Application No. PCT/DK2022/050218, dated Dec. 16, 2022.

European Patent Office, extended European search report issued in corresponding EP Application No. 21208524.5, dated Apr. 25, 2022.

* cited by examiner

NACELLE FOR A WIND TURBINE

INTRODUCTION

The present invention relates to a nacelle for a wind turbine. The nacelle comprises a main unit and at least one auxiliary unit mounted on a side of the main unit, the at least one auxiliary unit comprises an assembled configuration and a transportation configuration. The invention further relates to a transport method for such a nacelle.

BACKGROUND

Wind turbines increase in size in terms of nominal power output as well as in terms of physical dimensions of the individual parts of the wind turbine. Therefore, the size of the nacelle must also be increased to accommodate the required wind turbine components. For this reason, for instance in WO2021/098927A1, it has been suggested to split the nacelle into separate units, such that at least some of the units may be transported as standard shipping freight containers.

It has shown that due to the large sizes of some individual wind turbine components, these do not fit inside the dimensions of standard shipping freight containers, and as such it has until now been impossible for these cases to stay within the required transport dimensions.

SUMMARY

It is an object of embodiments of the disclosure to facilitate further modularity, ease of design and manufacturing, reduction of cost of manufacturing, installation and maintenance and/or allow for improved maintenance of wind turbines. It is a further object of embodiments of the disclosure to provide a nacelle which is transportable using ordinary transport means and to lower transportation and handling costs without limiting the possible size of the nacelle.

The invention relates to a wind turbine nacelle configured for mounting on a wind turbine tower and housing a rotor-supporting assembly supporting a rotor, the nacelle further housing a power conversion assembly, the nacelle comprising:
- a main unit arranged to be connected to the wind turbine tower and housing the rotor-supporting assembly, and
- at least one auxiliary unit housing an operative component forming part of the power conversion assembly,
- wherein the main unit and the auxiliary unit are separate units configured to be connected by a unit fixation structure at an interface, and
- wherein the at least one auxiliary unit has a first height in an assembled configuration and a second height in a transportation configuration, the first height being higher than the second height.

To avoid any doubt, the term 'height' in the context of this document is referring to a vertical extension, regardless of altitude.

The auxiliary unit may advantageously, in the transportation configuration, be formed with size and shape comparable to, or equal to, the size and shape of a shipping freight container. The unit thereby inherits the advantages of shipping freight containers with respect to handling, transportation, and storage. Shipping freight containers can for example be handled anywhere in the world by ship, train, and truck etc. and at lower costs compared to bulk transport.

The cost savings are even more pronounced when the auxiliary unit is a shipping freight container. A shipping freight container is also referred to as an intermodal container, a standard freight container, a box container, a sea freight container, or an ISO container, and refers in general to a container used to store and move materials and products in the global containerized intermodal freight transport system for intercontinental traffic. The shipping freight container follows the dimensional and structural specifications in the ISO standard of ISO 668:2013 for series 1 freight containers, including various lengths and various heights (including high cube), as defined in the ISO standard.

The main unit may, depending on the type of wind turbine, comprise further parts, e.g. a gear box, a bearing system and different kinds of peripheral equipment, e.g. for lubrication, cooling, and control purpose. The main unit may particularly comprise a main frame forming part of the rotor-supporting assembly and forming a load path from the rotor into the tower or intermediate tower structure, e.g. via a yawing arrangement. The main frame may particularly be a casted component. In addition to the main frame, the rotor-supporting assembly may comprise e.g. a bearing structure and other components supporting the rotor in the wind turbine.

In an embodiment of the invention, said at least one auxiliary unit comprises a bottom face, four side faces together defining a space, each of said four side faces having an upper part defining in combination a top perimeter; and a roof part, wherein the roof part in the transportation configuration is connected to at least part of said top perimeter in order to cover at least part of said space.

In an embodiment of the invention, in the assembled configuration, a roof extension frame is mounted between said top perimeter and said roof part; said roof extension frame being dismounted in the transportation configuration.

In an embodiment of the invention, in the assembled configuration, a roof extension frame is mounted between said top perimeter and said bottom face; said roof extension frame being dismounted in the transportation configuration.

In one embodiment, the roof extension frame may be positioned between the bottom face and the lower part of the four side faces. In another embodiment, the roof extension frame may be positioned somewhere along the height of the side faces, meaning that the side faces would be adapted to be split into two. Hereby the interfaces from the side faces to the roof part and the bottom face, respectively, will be left undisturbed.

The connection of the roof extension frame to the other elements, i.e. the bottom face, the sides faces or the roof part, can be done by any known connection means, i.e. welding, bolting or using latches.

In an embodiment of the invention, in the transportation configuration, a roof extension frame is positioned inside the auxiliary unit in separate extension plates.

When the roof extension frame can be split into segments and transported inside the auxiliary unit, a single container transport can onsite be transferred into a larger volume inside the auxiliary unit for use.

In an embodiment of the invention, said roof extension frame comprises at least two side extension plates and two end extension plates, and where at least two of these extension plates are welded or bolted together.

In further embodiments, the connection could be done otherwise as well, such as using latches to fixation the elements.

In other embodiments, the roof extension frame could be split into segments along other split lines, for instance resulting in at least one L-shaped segment. The full roof extension frame could for example be split into four identical L-shaped segments, potentially resulting in stronger corners. Alternatively, four L-shaped segments plus an additional straight segment along each side.

In an embodiment of the invention, each of said side extension plates comprises at least two segments, such as at least three segments.

In an embodiment of the invention, said roof extension frame has a height of at least 20 cm, such as at least 40 cm or at least 60 cm.

In an embodiment of the invention, said nacelle comprises a main unit and at least two auxiliary units.

In an embodiment of the invention, the main unit and the at least one auxiliary unit are arranged side by side in a direction away from a rotational axis defined by the rotor-supporting assembly.

In an embodiment of the invention, the operative component is at least one of a power conversion assembly, a transformer, or a converter.

In an embodiment of the invention, said power conversion assembly may involve conversion of electrical power into an energy carrier, such as hydrogen, ethanol, ammonia, or a liquid organic hydrogen carrier (LOHC).

In an embodiment of the invention the operative component may be an electrolysis cell stack or a battery. In a further embodiment of the invention, the operative component may be a transformer and a converter housed in the same auxiliary unit.

In an embodiment of the invention the at least one auxiliary unit has a first section having a first height (h1) and a second section having a second height (h2), and the first height (h1) being higher than the second height (h2).

An auxiliary unit is typically equipped with various types of equipment such as operative components which may form part of the power conversion assembly. Operative components come in many sizes, shapes and weights dependent on manufacturer and other potential applications of the operative components within wind turbines or in other technical fields. It was found to be highly advantageous and facilitating for modulization of wind turbine generators to increase the use of standard components, which are not specifically designed to (a specific) wind turbine generator type. For example, converters and transformers are used in many technical fields where the height is not of essence. For high-capacity converters, it would not be possible to fit such an equipment into an auxiliary unit of a small height, such as the height of a standard container. It was found to be highly advantageous to use an auxiliary unit where a first section has a first height that allow for housing of for example such a high-capacity converter and a second section of a second height housing equipment with a more limited height requirement, which allows the second height to be lower than the first heigh while still housing both types of equipment in the same auxiliary unit. This allowed for reducing cost of the auxiliary unit and at the same time increasing the degree of modulization and flexibility with regard to types of equipment that may be housed in the auxiliary unit.

In an embodiment of the invention the first section is between 25% to 75% of the surface area of the auxiliary unit.

In an embodiment of the invention the auxiliary unit has a transport configuration and an assembled configuration, and in the transport configuration the height of both the first and the second sections are the second height (h2). The second height preferably corresponds to a height of a standard container and the auxiliary unit is equipped with standard (ISO) corners for lifting and securing of containers.

In an embodiment of the invention at least a part of the volume defined by the difference between the transport configuration and the assembled configuration is housing an air-conditioning unit, such as a heating, a cooling, a dehumidifying, a desalination unit, or a unit combining two or more of these functions. For example, an air-conditioning unit is placed on the roof in a first section or the roof or a part of the roof in a first section is removed and an air-conditioning unit is connected to the top perimeter in a (part of) a first section. It is preferred that the air-conditioning unit comprises an air-conditioning housing that will form part of the side faces and roof part of the nacelle when the air-conditioning unit is connected to the auxiliary unit.

In an embodiment of the invention the roof part comprises a first roof section and a second roof section, and the second roof section is permanently fixed to said top perimeter and first roof section is releasably connected to the top perimeter, preferably the first roof section covers at least the first section.

In an embodiment of the invention the first roof section comprises at least two roof sub-sections separated by the second roof section. For example, two sub-sections of the first section are arranged near the ends of the auxiliary unit with a second section therebetween; or two sub-sections of the first section are arranged near the sides of auxiliary unit with a second section therebetween; or one sub-section of the first section is arranged near one end of the auxiliary unit and another sub-section of the first section is arranged near one side of the auxiliary unit and optionally connected to said one sub-section arranged near one end with the second section arranged in other parts of the auxiliary unit. Sub-sections of the first section may have the same height, different height or varying height.

In an embodiment of the invention the first height (h1) is higher than the second height (h2) by at least 20 cm, such as at least 40 cm or at least 60 cm, and preferably at most 100 cm.

Furthermore, the invention relates to an installation method comprising the steps of providing a main unit, providing at least one auxiliary unit, shifting the configuration of said at least one auxiliary unit between a transportation configuration and an assembled configuration, and connecting the at least one auxiliary unit to the main unit.

In an embodiment of the invention, said step of connecting the at least one auxiliary unit to the main unit is after said step of shifting the configuration.

In an embodiment of the invention, said step of connecting the at least one auxiliary unit to the main unit is performed on-site.

By carrying out the connecting on the site of installation of the wind turbine, the transportation costs may be lower. More transports will be needed, but each of them will be much lower.

In an embodiment of the invention, said method further comprises the step of moving extension plates of a roof extension frame into or out from the at least one auxiliary unit.

BRIEF DESCRIPTION OF THE DRAWINGS

In the following, embodiments of the disclosure will be described in further details with reference to the drawing in which.

DETAILED DESCRIPTION OF INVENTION

The detailed description and specific examples, while indicating embodiments, are given by way of illustration only, since various changes and modifications within the spirit and scope of this disclosure will become apparent to those skilled in the art from this detailed description.

Figure 1A:
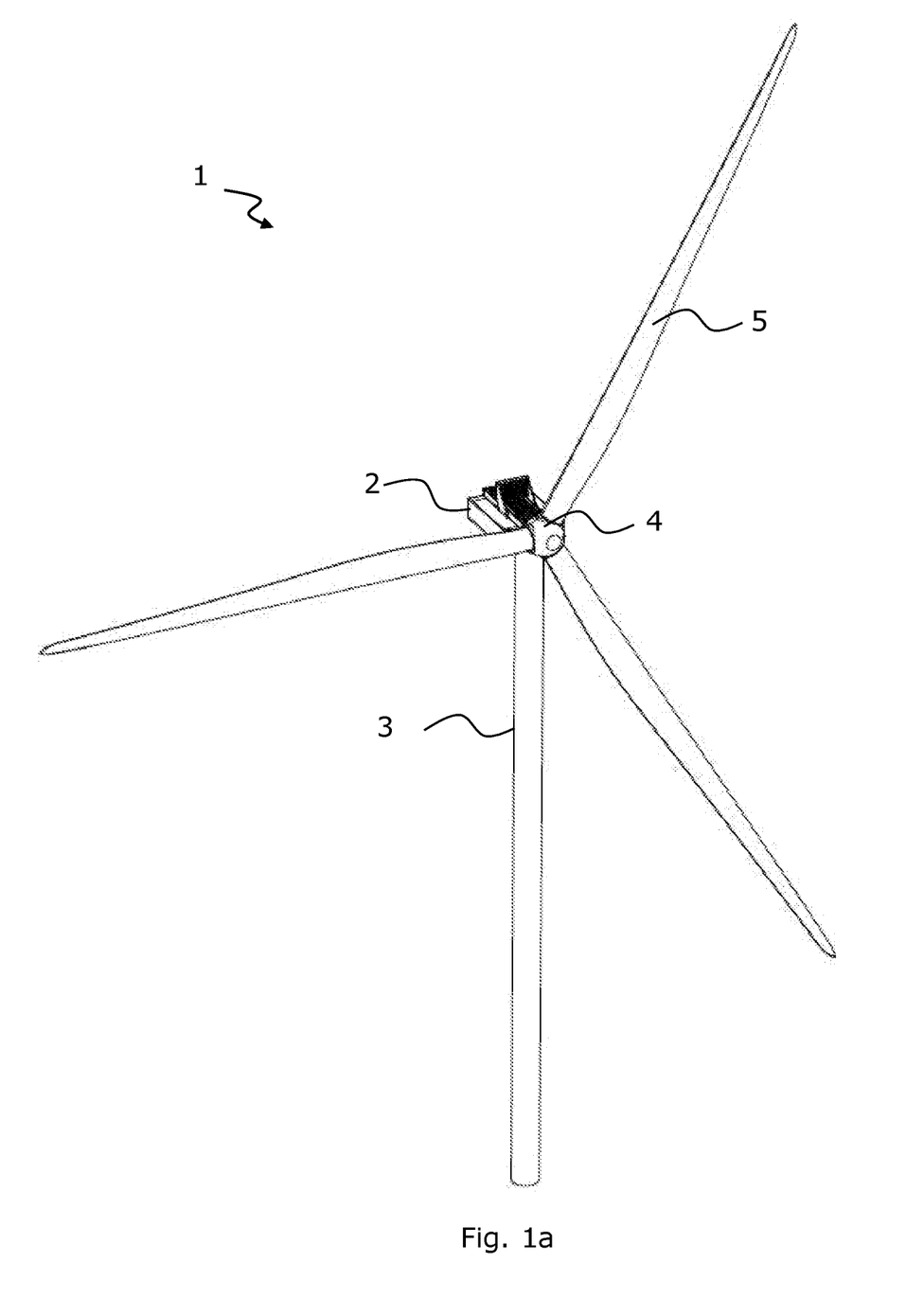
FIGS. 1a and 1b illustrate wind turbines.
Figure 1B:
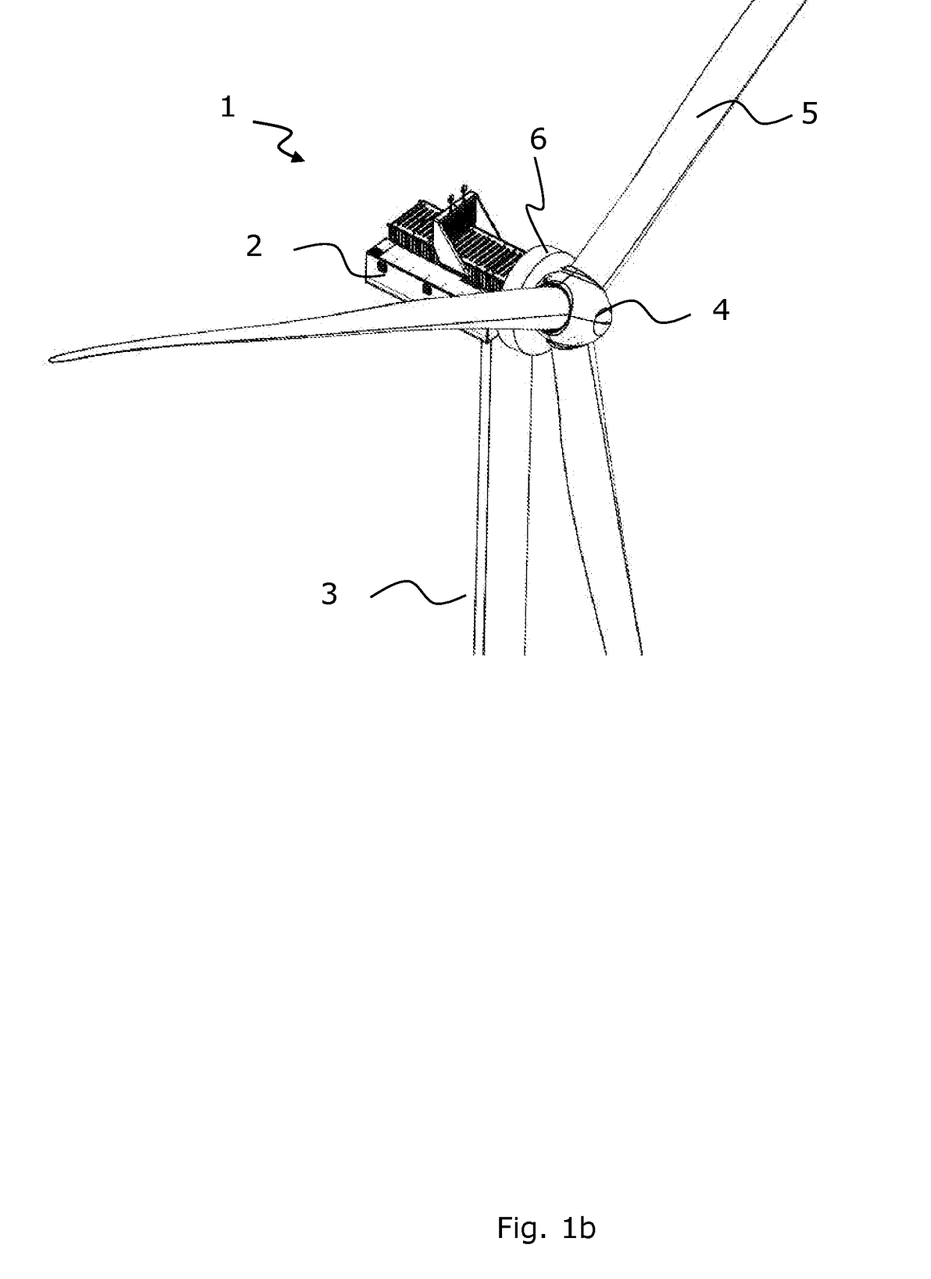

FIGS. 1a and 1b illustrate wind turbines 1 with a nacelle 2 mounted on a tower 3. A hub 4 carrying three rotor blades 5 forms a rotor and is carried by a rotor-supporting assembly in the nacelle 2.

Typically, the rotor-supporting assembly comprises a rotor shaft connecting a gear arrangement and a generator to the hub. A gear is, however, not always required since the generator could be directly driven by the shaft. FIG. 1b illustrates a direct drive wind turbine with the generator 6 located outside the nacelle.

Figure 2:
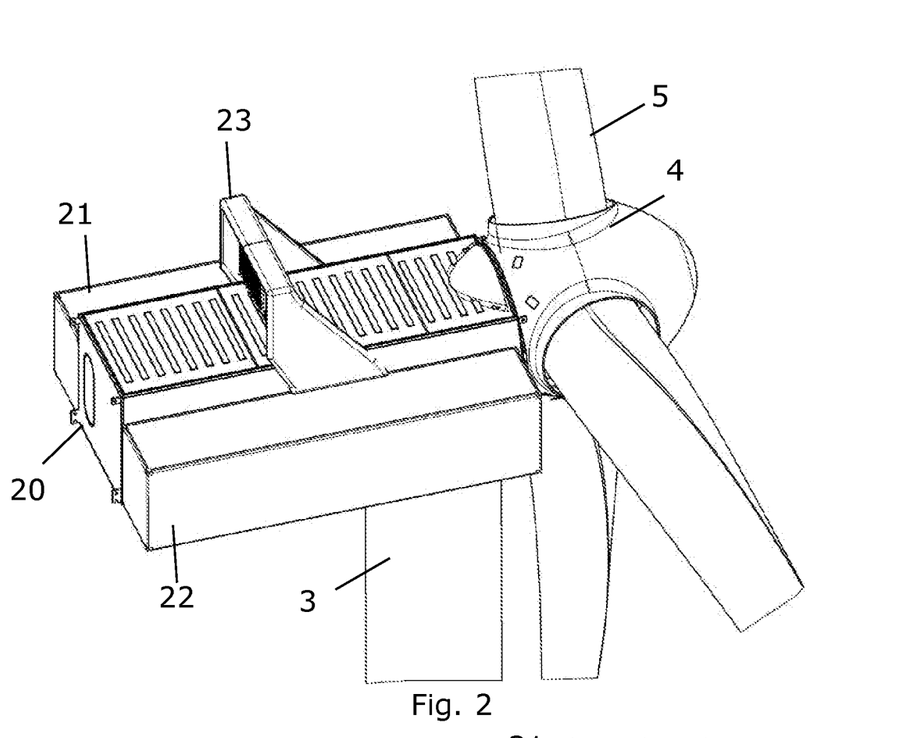
FIG. 2 illustrates the nacelle of a wind turbine.

FIG. 2 illustrates that the nacelle comprises a main unit 20 and two auxiliary units 21, 22. A cooling area 23 is arranged on top of the nacelle. The cooling area is formed by a heat exchanger which may form part of the main unit, and/or any of the auxiliary units. The main unit 20 is mounted on the tower 3 via a yawing arrangement (not shown), allowing the nacelle 2 to rotate in order to direct the rotor into the wind.

Figure 3:
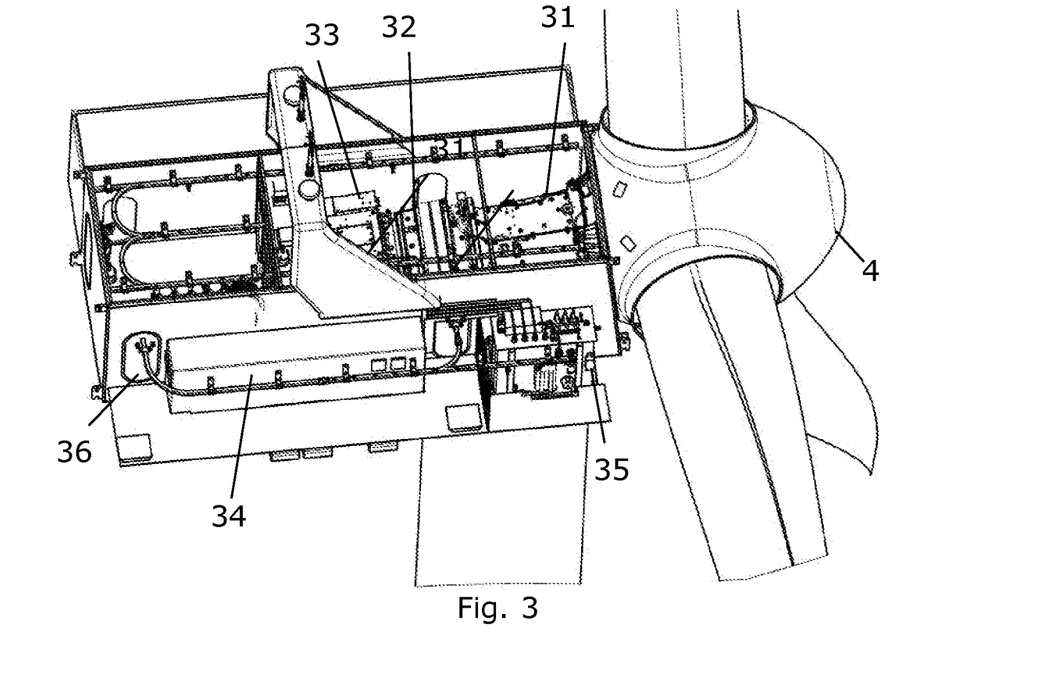
FIG. 3 illustrates a perspective view of the nacelle of FIG. 2.

FIG. 3 illustrates a perspective view of the nacelle 2 of FIG. 2. In FIG. 3 the outer walls of the nacelle 2 are (for the sake of explanation) transparent, thereby revealing the interior parts of the nacelle 2 and the wind turbine components accommodated therein. The main unit 20 accommodates a main bearing unit 31 supporting a main shaft for rotation therein, a gear arrangement 32 and a generator 33, arranged sequentially behind the hub 4, along a direction defined by the rotational axis of the hub 4. The components in the main unit primarily form part of the drivetrain.

The auxiliary unit 22 accommodates a transformer unit 34, and a converter unit 35 which herein constitute two different operative components being accommodated in the auxiliary unit but carried by the main unit. In alternative embodiments, the operative component could be a power conversion assembly such as an electrolysis cell stack, a battery.

Each auxiliary unit 21, 22 is mounted along a side of the main unit 20 by a unit fixation structure. In the disclosed embodiment, they are mounted in such a manner that one auxiliary unit 21 is mounted along a right side of the main unit 20 and the other auxiliary unit 22 is mounted along a left side of the main unit 20, as seen in a direction along a rotational axis of the hub 4 from the hub 4 towards a rear wall of the main unit 20.

The main unit and the auxiliary units are enclosed and optionally sealable units such that one compartment is formed by the auxiliary unit, defining an auxiliary space and another compartment is formed by the main unit, defining a main space. That allows the drivetrain to be isolated from the converter and transformer. The two compartments may be joined by the cooperating openings 36 allowing personnel and equipment to enter from the main space in the main unit into the auxiliary space in the auxiliary unit. The openings 36 may be sealed and thereby prevent fire etc. from spreading from one of the main and auxiliary unit to the other one of the main and auxiliary unit.

Figure 4:
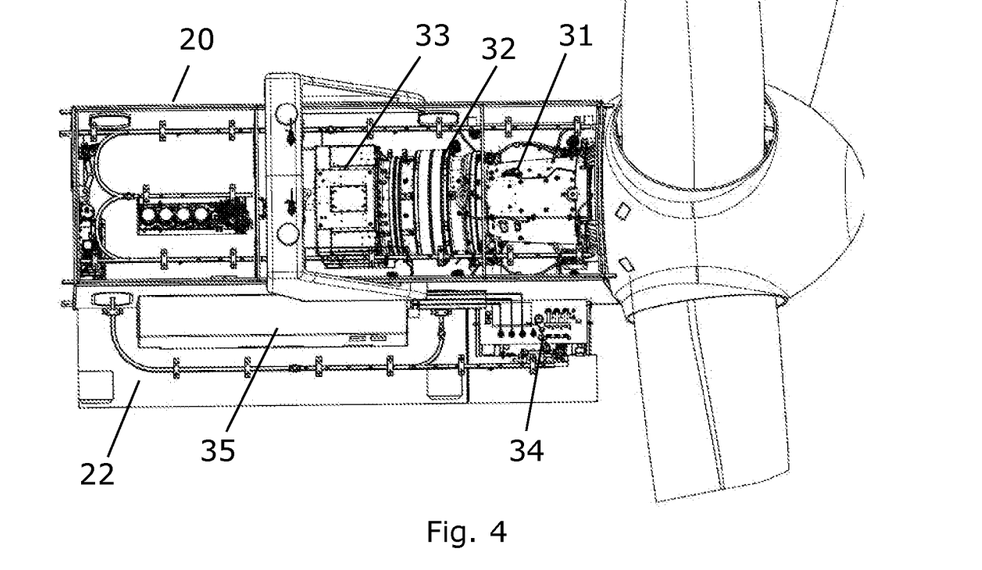
FIG. 4 illustrates the nacelle from FIG. 3 but seen from above.

FIG. 4 illustrates a nacelle seen from above.

Figure 5:
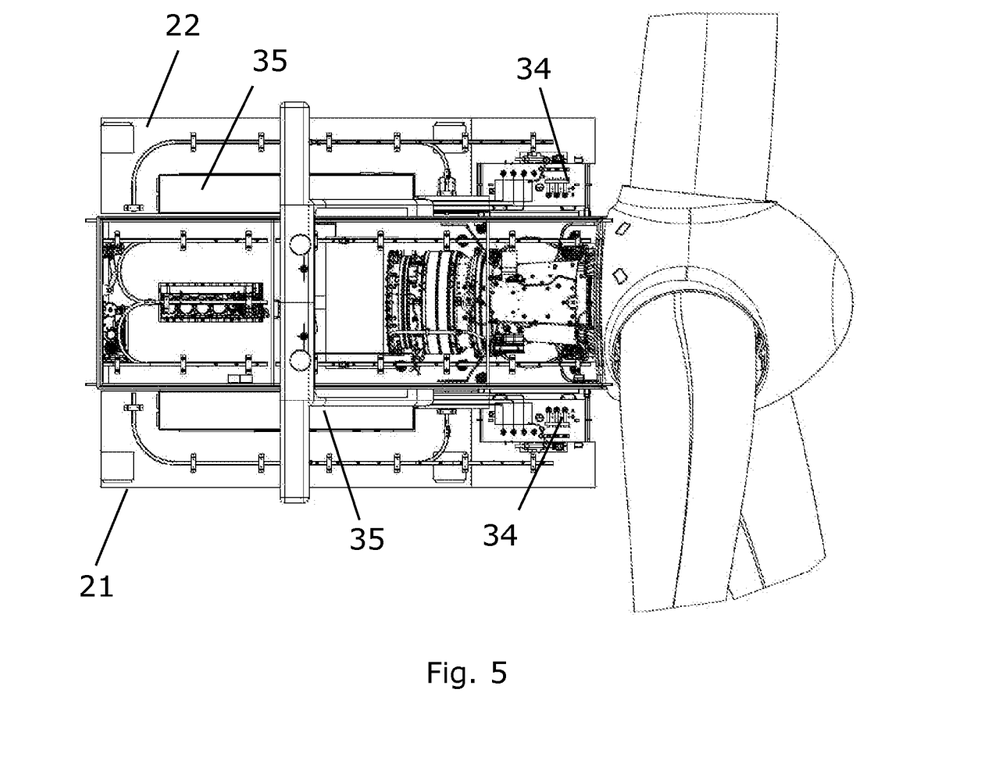
FIG. 5 illustrates an embodiment where the left and right-side auxiliary units contain identical components.

FIG. 5 illustrates an embodiment where the left and right-side auxiliary units contain at least one identical component establishing a weight balance and a double function. The double function means that the wind turbine comprises two similarly functioning components, one contained in each of the auxiliary units. The components may be identical in nature and specification. In case of component failure of one unit, the wind turbine may continue operation on reduced power while the operative component in the other auxiliary unit is replaced.

In FIGS. 2-5, the auxiliary units are constituted by elements having generally the shape and size of standardised freight containers such as a 40-foot shipping freight containers having a dimension and structural specifications as provided by the ISO standard, ISO 668:2013 for series 1 freight containers. The auxiliary units are attached to the main unit by the ISO-corner lifting structure, typically moulded in steel and constituting a particularly strong interface to the container.

Figure 6:
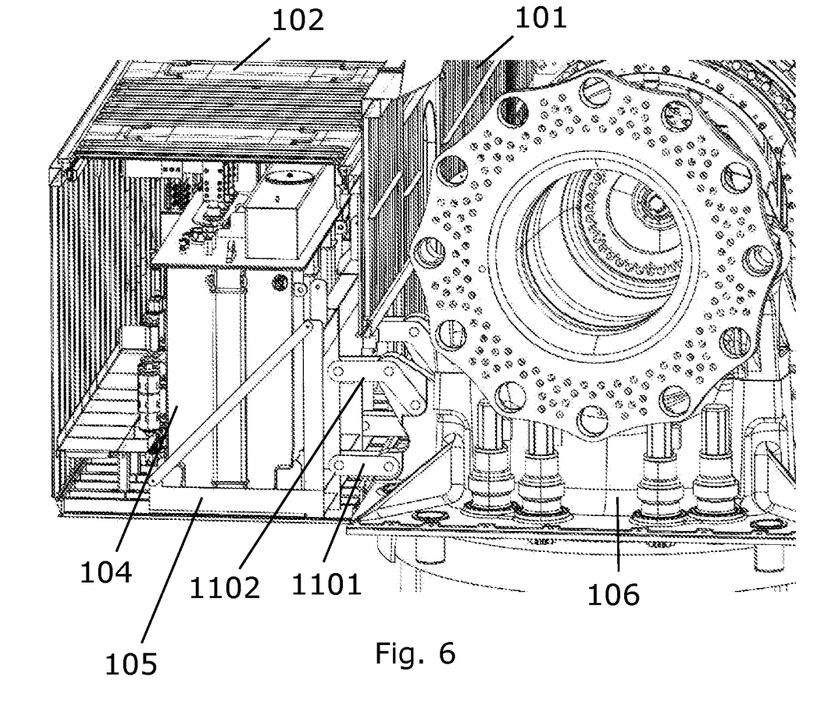
FIG. 6 illustrates an embodiment in which a transportation configuration may not be needed.

FIG. 6 illustrates the main unit 101 and the auxiliary unit 102 joined by the unit fixation structure making use of the stronger corner lifting points of the container which constitutes the auxiliary unit 102.

The transformer 104 is carried by a support frame 105 resting on the bottom of the auxiliary unit 102 and it is suspended directly on the main frame 106 inside the main unit 101. The main frame thereby forms part of the load path for the operative component into the tower.

As there are many different wind turbine models, it will also be interesting to be able to use the shown set-up with different sizes of transformers. In the shown figure, the transformer 104 is of a size, where it can be accommodated within the height of the standard container (here 102). However, in cases where a larger (in particular higher) transformer is a needed for a wind turbine, until now it has not been able to combine this with achieving the benefits of using standard shipping freight containers.

An auxiliary unit 102 will typically comprise a bottom face and four side faces together defining a space, on top of which a roof can be placed. A typical example of this is indeed a standard shipping freight container. When needed, such containers are provided with a removable roof, which rests on a top perimeter established by the four side faces.

Figure 7:
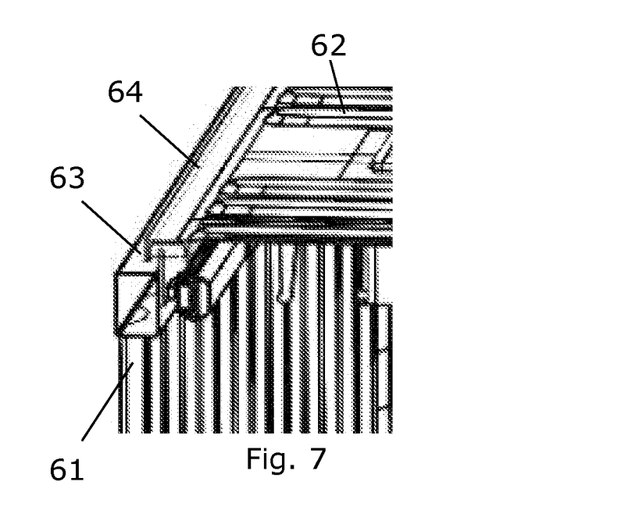
FIG. 7 illustrates a close-up of part of FIG. 6.

FIG. 7 is a close-up of the left side of the top section of the auxiliary unit 102 in FIG. 6. Here a side face 61 can be seen as well as the roof part 62. The upper part 63 of the side face 61 is shown and it is seen that the side part 64 of the roof part 62 is resting on top of the upper part 63. Hereby, the roof part 62 can be removed when needed and re-installed when needed.

The central part of the present invention is to provide an auxiliary unit which has two configurations with two heights, namely a first height in an assembled configuration and a second height in an transportation configuration, the first height being higher than the second height. Hereby, in the transportation configuration all benefits can be achieved regarding the use of standard shipping freight containers. Once the auxiliary unit then arrives to the desired destination, typically the installation site, the auxiliary unit can be converted into an assembled configuration, where the height is increased to enable sufficient space inside the auxiliary unit, as needed. In some cases, the component needing additional space/height may not be possible to transport together with the auxiliary unit, but a plurality of such components may then be gathered into only one special transport instead of requiring this for each individual transport of auxiliary units. In other cases, the reason why additional space/height is needed may be simply heat radiation or the like which requires a safety distance when the wind turbine is in production mode, but where this additional space is not mandatory during transport.

Figures 8A, 9A:
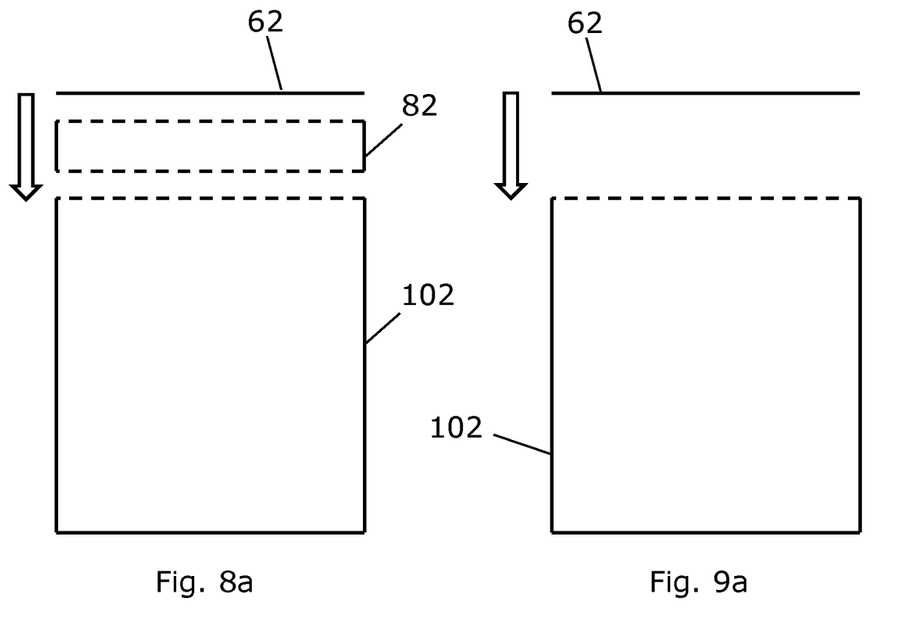
FIGS. 8a, 8b, 9a, and 9b schematically illustrate the preparation of the assembled configuration vs. the preparation of the transportation configuration.
Figures 8B, 9B:
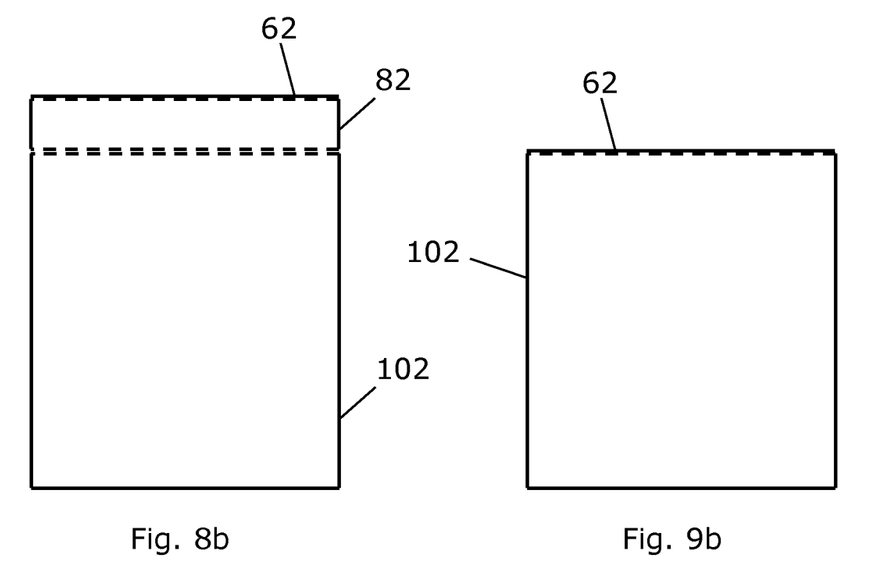

FIGS. 8a and 8b show schematically the installation of the roof part 62 on the roof extension frame 82, and further the installation of the roof extension frame 82 on the auxiliary unit 102, thereby creating the assembled configuration.

FIGS. 9a and 9b for comparison show schematically the installation of the roof part 62 on the auxiliary unit 102, thereby creating the transportation configuration.

For both configurations, the interface between roof part 62 and extension frame 82, between extension frame 82 and auxiliary unit 102, or between roof part 62 and auxiliary unit 102 may be similar to as shown in FIG. 7, or the interfaces may be different. For instance, the connection may be with vertical supporting flanges on the inside (as shown in FIG. 8), or with vertical supporting flanges on the outside.

Figure 10:
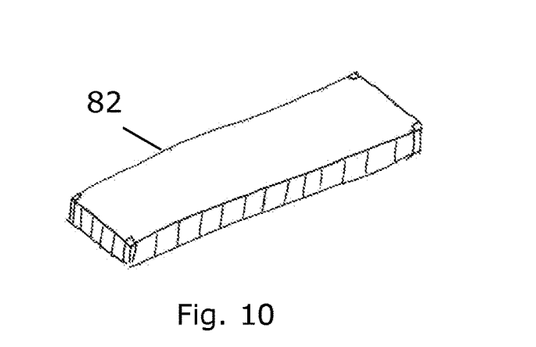
FIG. 10 illustrates an extension frame according to an embodiment.

FIG. 10 shows an example of an extension frame 82. As part of the invention, this extension frame 82 may be one single welded element. However, advantageously it may be split into a plurality of individual segments in order to facilitate easier transportation of the extension frame.

Figure 11:
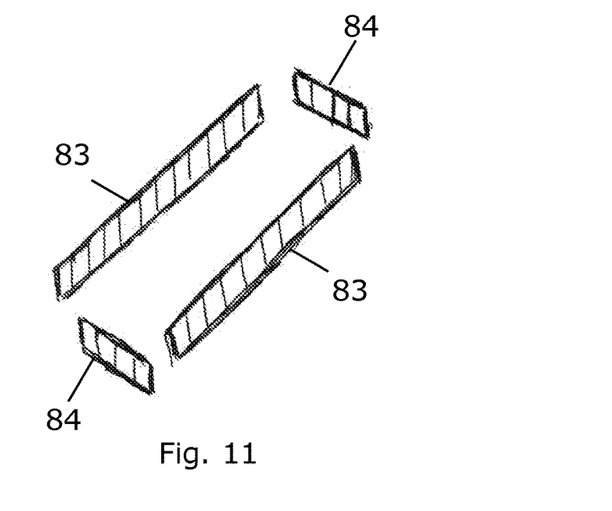
FIG. 11 illustrates an extension frame according to an embodiment in segments.

FIG. 11 shows an example, where the extension frame 82 is split into four individual extension frame segments, two side extension plates 83 and two end extension plates 84.

Figure 12:
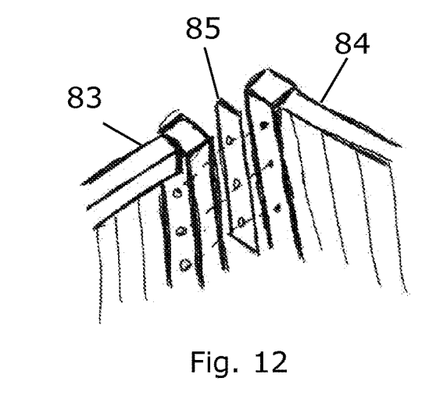
FIG. 12 illustrates a close-up of a corner of an extension frame according to an embodiment.

FIG. 12 shows a close-up of a possible connection between two extension frame segments 83 and 84. In between these are shown a sealing element 85 which may serve various purposes, but primarily ensuring that even in harsh weather no water will enter inside the auxiliary unit through the connection. Further FIG. 12 indicates bolt holes, through which bolts may be used to gather and tighten the extension frame segments.

In alternative embodiments, the connection may be carried out otherwise, for instance separate corner elements may be used, to which both a side extension plate 83 and an end extension plate 84 may be connected. In such embodiment, more strength may be built into the corner elements, as needed.

Figure 13:
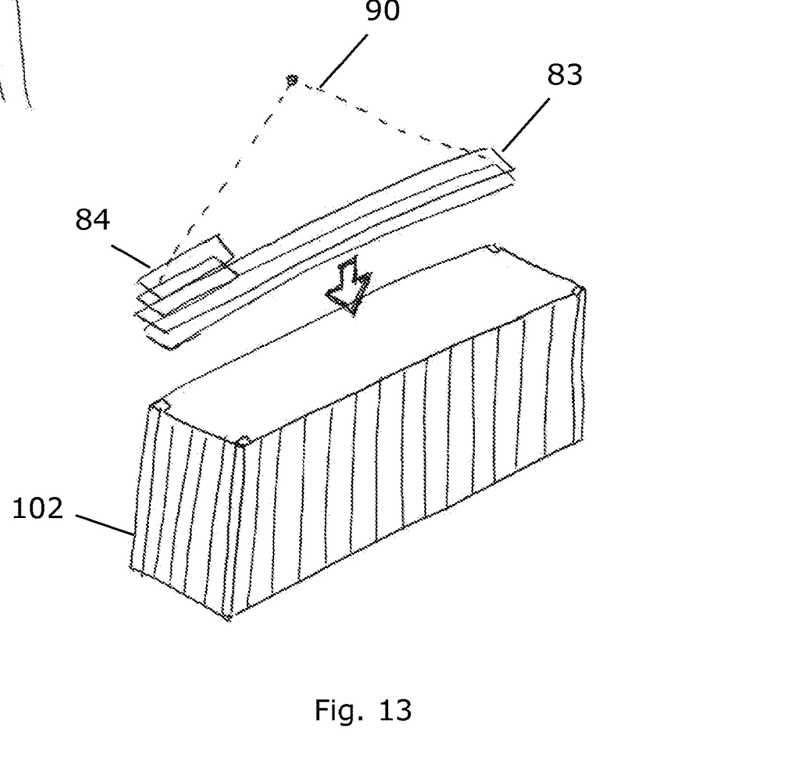
FIG. 13 illustrates the packaging of an extension frame in segments according to an embodiment.

FIG. 13 shows a schematic and simplified embodiment where the extension frame segments 83/84 have been stacked and are lifted by lifting means 90 to be stored inside the auxiliary unit 102 during transport. This means that after also mounting the roof part 62, the auxiliary unit 102 is in a transportation configuration, but with all elements inside to be prepared to go into the assembled configuration, once the intended destination has been reached.

It should be noted that although FIGS. 11 and 13 show the extension frame 82 being split into four individual elements, this should only be considered as one embodiment of many. For instance, the longest of the side extension plates 83 and end extension plates 84 may advantageously be split into at least two further frame segments, as this may result in improved options for how to place the frame segments inside the auxiliary unit in the transportation configuration.

Figure 14:
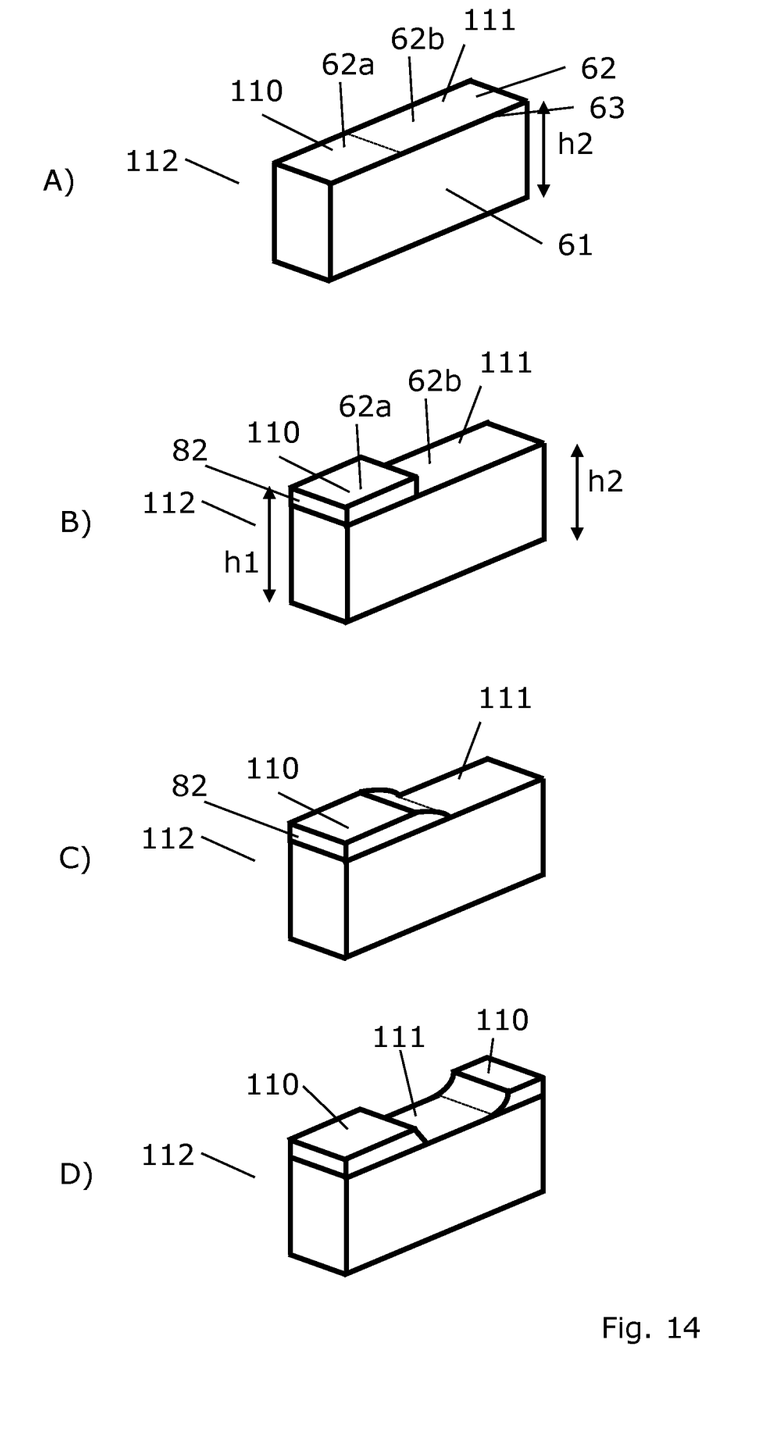
FIG. 14 illustrated auxiliary units with a first section and a second section.

FIG. 14A) shows an auxiliary unit 112 in a transport configuration. The separation between the position of the first section 110 and second section 110 is indicated by a dotted line. In the transport configuration the both the first roof section 62a and the second roof section 62b are arranged to be the same height h2. The roof may be one part 62 or separate parts 62a, 62b arranged in the same heigh and connected directly or via a connecting element (not shown) in the transport configuration.

In FIG. 14B), an auxiliary unit in the assembled configuration is shown. In one embodiment (even thou not preferred), the auxiliary unit 112 is manufactured directly to what corresponds to the assembled configuration, but it is preferred that the auxiliary unit 12 is manufactured in the transport configuration and later—for example at a preassembly site—is converted into the assembled configuration. In FIG. 14B) it is observed that the auxiliary unit 112 comprises a first section 110 with a roof section 62a at height h1 and a second section 111 with a roof section 62b at height h2. The height h1 of the first roof section 62a is defined by the greatest highest of the roof of the first section 110. The height h2 of the second roof section 62b is defined by the lowest height of the roof of the second section 111. Furthermore, it is preferred that the height h2 of the second roof section 62b corresponds to a height of a standard container as this facilitate handling and transportation. It should be observed that the second roof section 62b may be permanently fixed to the upper part 63 defining in a top perimeter or temporarily fixed to the upper part 63 when in the transport configuration.

The transition between the first section(s) 110 and the second section(s) 110 may be stepped with one step as shown in FIG. 14B) or in more than one step (not shown). On the other hand, other transitions may also be advantageous as exemplified in FIG. 14C) where the transition is a gradual rounded transition and in FIG. 14D) where the transition is oblique in one transition and gradual rounded in the other end. The first section may alternatively be 3D shaped such as dome shaped. The transition may for example be chosen based on aerodynamic preferences or the shape of the equipment housed in the auxiliary unit 112.

In FIG. 14D), it is also exemplified that the auxiliary unit may comprise more than one first sections 110.

FIG. 14E) another embodiment of an auxiliary unit 112 is shown. Here, the first section 110 is arranged along a longitudinal direction of the auxiliary unit 112. This may for example be advantageous if a very high panel is arranged along the side of the auxiliary unit 112.

The volume defined by the difference between the transport configuration and the assembled configuration of the auxiliary unit 112 may be occupied by separate units. If was found to be particularly advantageous that at least a part of the volume houses an air-conditioning unit 115, as this allows for the complete air-conditioning unit to be manufactured separately and later—for example during preassembly-connect the air-conditioning unit to the rest of the auxiliary unit 112. Extension. The air-conditioning unit 115 may handle one or more functions of cooling, heating, dehumidifying and desalination. In FIG. 14F), an example of an air-conditioning unit 115 suitable for being arranged in or forming part of a first section 110 of an auxiliary unit is shown. In FIG. 14G), the air-conditioning unit is shown with the auxiliary unit 112 in the assembled configuration.

Although the invention has been described above in connection with preferred embodiments of the invention, it will be evident for a person skilled in the art that several modifications are conceivable without departing from the invention as defined by the following claims.

Definitions

Herein, the term "nacelle" means the generally accepted term describing the machine house for a wind turbine, i.e. that part which carries the rotor and drivetrain, and which is carried by the wind turbine tower.

The terms "main unit" and "auxiliary unit" herein refers to units which can be transported separately, and which can be assembled with one or more other units to form the nacelle. Herein, the term "rotor-supporting assembly" refers to those parts of the nacelle which carries the rotor, typically a drivetrain, a main bearing and a main frame. The drivetrain may include different components depending on the type of wind turbine, e.g. a rotor shaft, the generator, and optionally a gearbox between the rotor shaft and the generator.

With the term "unit fixation structure" is to be understood any type of structure which can be used to connect the main unit and the auxiliary unit sufficiently for these to afterwards be handled like a single unit.

The invention claimed is:

1. A wind turbine nacelle configured for mounting on a wind turbine tower and housing a rotor-supporting assembly supporting a rotor, the nacelle further housing a power conversion assembly, the nacelle comprising:
   a main unit arranged to be connected to the wind turbine tower and housing the rotor-supporting assembly, and
   at least one auxiliary unit housing an operative component forming part of the power conversion assembly, the at least one auxiliary unit including a roof part
   wherein the main unit and the auxiliary unit are separate units configured to be connected by a unit fixation structure at an interface, and
   wherein the at least one auxiliary unit has a first height defined by a greatest height of the roof part in an assembled configuration and a second height defined by a greatest height of the roof part in a transportation configuration, the first height being higher than the second height.

2. The nacelle according to claim 1, wherein said at least one auxiliary unit in the transportation configuration has the size and shape of a shipping freight container having structural specifications as provided by the ISO standard, ISO 668:2013 for series 1 freight containers.

3. The nacelle according to claim 1, wherein said at least one auxiliary unit comprises
   a bottom face,
   four side faces together defining a space, each of said four side faces having an upper part defining in combination a top perimeter; and
   the roof part,
   wherein the roof part in the transportation configuration is connected to at least part of said top perimeter in order to cover at least part of said space.

4. The nacelle according to claim 3, wherein, in the assembled configuration, a roof extension frame is mounted between said top perimeter and said bottom face; said roof extension frame being dismounted in the transportation configuration.

5. The nacelle according to claim 3, wherein, in the transportation configuration, a roof extension frame is positioned inside the auxiliary unit in separate extension plates.

6. The nacelle according to claim 3, wherein the roof part comprises a first roof section and a second roof section, and the second roof section is permanently fixed to said top perimeter and first roof section is releasably connected to the top perimeter, preferably the first roof section covers at least the first section.

7. The nacelle according to claim 1, wherein, in the assembled configuration, a roof extension frame is mounted between said top perimeter and said roof part; said roof extension frame being dismounted in the transportation configuration.

8. The nacelle according to claim 7, wherein said roof extension frame comprises at least two side extension plates and two end extension plates, and where at least two of these extension plates are welded or bolted together.

9. The nacelle according to claim 8, wherein each of said side extension plates comprises at least two segments, such as at least three segments.

10. The nacelle according to claim 7, wherein said roof extension frame has a height of at least 20 cm, such as at least 40 cm or at least 60 cm.

11. The nacelle according to claim 1, wherein said nacelle comprises a main unit and at least two auxiliary units.

12. The nacelle according to claim 1, wherein the main unit and the at least one auxiliary unit are arranged side by side in a direction away from a rotational axis defined by the rotor-supporting assembly.

13. The nacelle according to claim 1, wherein the operative component is at least one of a power conversion assembly, a transformer, or a converter.

14. The nacelle according to claim 1, wherein the roof part of the at least one auxiliary unit has a first section having a first height (h1) and a second section having a second height (h2), and the first height (h1) being higher than the second height (h2).

15. The nacelle according to claim 14, wherein the first section is between 25% to 75% of the surface area of the auxiliary unit.

16. The nacelle according to claim 14, wherein the auxiliary unit has a transport configuration and an assembled configuration, and in the transport configuration the height of both the first and the second sections are the second height (h2).

17. The nacelle according to claim 14, wherein the first roof section comprises at least two roof sub-sections separated by the second roof section.

18. The nacelle according to claim 14, wherein the first height (h1) is higher than the second height (h2) by at least 20 cm, such as at least 40 cm or at least 60 cm.

19. The nacelle according to claim 1, wherein at least a part of the volume defined by the difference between the transport configuration and the assembled configuration is housing an air-conditioning unit, such as a heating, a cooling, a dehumidifying, a desalination unit, or a unit combining two or more of these functions.

20. An installation method for the wind turbine nacelle according to claim 1, the method comprising the steps of:
   providing a main unit,
   providing at least one auxiliary unit, shifting the configuration of said at least one auxiliary unit between a transportation configuration and an assembled configuration, and connecting the at least one auxiliary unit to the main unit.

21. The installation method according to claim 20, wherein said step of connecting the at least one auxiliary unit to the main unit is after said step of shifting the configuration.

22. The installation method according to claim 20, wherein said step of connecting the at least one auxiliary unit to the main unit is performed on-site.

23. The installation method according to claim 20, further comprising the step of moving extension plates of a roof extension frame into or out from the at least one auxiliary unit.

24. A wind turbine nacelle configured for mounting on a wind turbine tower and housing a rotor-supporting assembly supporting a rotor, the nacelle further housing a power conversion assembly, the nacelle comprising:

a main unit arranged to be connected to the wind turbine tower and housing the rotor-supporting assembly, and at least one auxiliary unit housing an operative component forming part of the power conversion assembly, the at least one auxiliary unit including a bottom face, four side faces, and a roof part that together define an interior space, wherein the main unit and the auxiliary unit are separate units configured to be connected by a unit fixation structure at an interface, and wherein the at least one auxiliary unit has a first height defined by a greatest height of the roof part in an assembled configuration and a second height defined by a greatest height of the roof part in a transportation configuration, the first height being higher than the second height to increase the interior space.

* * * * *